United States Patent
Kaino

(10) Patent No.: US 8,674,657 B2
(45) Date of Patent: Mar. 18, 2014

(54) RECHARGEABLE BATTERY CHARGING METHOD, RECHARGEABLE BATTERY CHARGE CONTROLLING DEVICE AND BATTERY PACK

(75) Inventor: Tomomi Kaino, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 401 days.

(21) Appl. No.: 13/033,018

(22) Filed: Feb. 23, 2011

(65) Prior Publication Data

US 2011/0204850 A1 Aug. 25, 2011

(30) Foreign Application Priority Data

Feb. 24, 2010 (JP) ................................. 2010-039016

(51) Int. Cl.
*H02J 7/00* (2006.01)
(52) U.S. Cl.
USPC .......................................... 320/116; 320/128
(58) Field of Classification Search
USPC .......................................................... 320/116
See application file for complete search history.

(56) References Cited

U.S. PATENT DOCUMENTS

| 2002/0003493 A1* | 1/2002 | Durst et al. .............. 342/357.07 |
| 2004/0145840 A1* | 7/2004 | Langford et al. ................ 361/42 |
| 2005/0225289 A1* | 10/2005 | Iida et al. ........................ 320/116 |
| 2009/0243557 A1* | 10/2009 | Sekine et al. .................. 320/166 |

FOREIGN PATENT DOCUMENTS

| JP | 2008-5644 | 1/2008 |
| JP | 2009-44946 | 2/2009 |

* cited by examiner

*Primary Examiner* — Arun Williams
(74) *Attorney, Agent, or Firm* — Wenderoth, Lind & Ponack, L.L.P.

(57) ABSTRACT

If a protection voltage (or setting voltage value) is continuously exceeded for two times (three times) by all of the voltage values of a battery block that are read periodically at a period of 250 ms, it is determined that the voltage of the battery block exceeds the protection voltage value of 4.32 V (or setting voltage value of 4.30 V) so that a target value of charging current is reduced to 0.1 C (or reduced to a value smaller than the currently-set target value) at the first determination. Every when it is detected that the voltage value exceeds the setting voltage value, the target value is reduced at a predetermined reduction rate. As a result, charging current is exponentially reduced whereby keeping the charging operation. At the second determination where the voltage of the battery block exceeds the protection voltage, a circuit breaker cuts off the charging current.

11 Claims, 8 Drawing Sheets

FIG. 2

| TEMP. RANGE<br>VOLTAGE RANGE | LOW TEMP. RANGE | NORMAL TEMP. RANGE | HIGH TEMP. RANGE |
|---|---|---|---|
| SMALLER THAN A (V) | 0.5C | 0.8C | 0.8C |
| A (V) TO B (V) | 0.5C | 0.5C | 0.5C |
| B (V) TO C (V) | 0.35C | 0.5C | 0.5C |
| NOT SMALLER THAN C (V) | 0.1C | 0.1C | 0.1C |

A : 4.00
B : 4.08
C : 4.15

RECHARGEABLE BATTERY CHARGING METHOD, RECHARGEABLE BATTERY CHARGE CONTROLLING DEVICE AND BATTERY PACK

BACKGROUND OF THE INVENTION

1. Field of the Invention

The present invention relates to a rechargeable battery charging method and a rechargeable battery charge controlling device that charge a rechargeable battery based on a target value of charging current, and a battery pack including this rechargeable battery charge controlling device.

2. Description of the Related Art

When charged, rechargeable batteries (hereinafter simply referred to as batteries) such as lithium ion batteries are typically charged at setting current and voltage values that fall within ranges not higher than the available maximum current and voltage (protection voltage for preventing the batteries from being overcharged) that are specified depending on the types of the batteries. Various charge controlling methods for this type of battery have been proposed in the past. In a most typical method, a battery is charged at charging voltage within a predetermined upper limit constantly at a setting current value in the beginning of charging operation, and is then charged constant at a setting voltage value after the charging current becomes lower than the setting current value (so-called constant-current and constant-voltage charging method, or constant-voltage and constant-current charging method). The level of the setting voltage value influences the life (deterioration degree) of a battery and the actual capacity of the battery as capacity that can be actually discharged from the battery. In terms of the level of the setting voltage value, the life and the actual capacity of a battery has a trade-off relationship. For example, the Japanese Patent Laid-Open Publication No. 2008-5644 discloses that the setting voltage value is gradually reduced with increasing the number of charging/discharging cycles of a battery whereby increasing the life of the battery but providing sufficient actual capacity in the case where the number of charging/discharging cycles is relatively small.

On the other hand, in the case where a battery pack with a plurality of serially-connected batteries is charged by the constant-current and constant-voltage charging method, it is necessary to take it into consideration that the battery voltages of the batteries will get unbalanced as the number of charging/discharging cycles increased. For this reason, the setting voltage and current values are often set at lower values in accordance with the highest battery voltage. For example, Japanese Patent Laid-Open Publication No. 2009-44946 discloses that, if the battery voltage of one of batteries exceeds a setting voltage value charging electric power is reduced so that the batteries are kept charged at the reduced setting voltage value and/or the reduced setting current value whereby suppressing increase of charging time and reduction of the actual capacity of a battery pack with the battery voltages of the batteries being unbalanced.

Batteries have a certain amount of internal resistance. When current flows at a setting current value through a battery in charging operation, voltage is produced by the internal resistance. In order to prevent abnormal rises of battery voltage, it is preferable that the setting current value be increased/reduced if the battery voltage when the battery is not charged/discharged is higher/lower. It is known that the internal resistance decreases/increases if the battery temperature gets higher/lower.

Japanese Patent Laid-Open Publication No. 2009-44946 discloses that the setting current values are optimized in accordance with the higher/lower level of battery voltage and battery temperature. On the basis of this method, in some cases, in order to reduce battery charging time, batteries are charged at a voltage within a range not higher than an upper limit that is higher than the protection voltage.

SUMMARY OF THE INVENTION

However, in the case where the upper limit of the charging voltage is set higher than the protection voltage, a problem arises that, when a battery starts being charged at a relatively large setting current value, its battery voltage may exceed the available maximum voltage of the battery. In order to avoid this, the setting current value is set lower than a current value that is required to reduce charging time. Alternatively, the charging operation is stopped when the battery voltage exceeds the maximum voltage. This problem tends to arise, for example, when the battery is quickly switched from discharging operation to charging operation. The reason is that the charging setting current value is optimized based on a battery voltage value that is detected lower than the battery voltage by the voltage drop of the internal resistance due to the discharging operation. Also, in a battery pack, even if the charging voltage is lower than the maximum voltage of the entire battery pack, when the battery pack starts being charged at the setting current value, in the case where the battery voltages of batteries are unbalanced, the battery voltage of some batteries may exceed the protection voltage.

The present invention is aimed at solving the problem. It is an object of the present invention to provide a rechargeable battery charging method and a rechargeable battery charge controlling device that can keep charging a rechargeable battery even if the battery voltage of the rechargeable battery exceeds a protection voltage when the rechargeable battery is charged at a relatively large amount of charging current in the beginning of charging operation, and a battery pack to be charged by this charging method.

A rechargeable battery charging method according to the present invention charges a rechargeable battery at constant current and constant voltage based on a target value as a maximum setting value of charging current. In the method, the voltage values of the rechargeable battery are detected in a time series. It is determined whether each of the detected voltage values exceeds (is larger than) a predetermined voltage value. The number of the determination times is counted that it is determined that detected voltage value exceeds the predetermined voltage value. The target value is reduced if the counted number of determination times does not exceed a predetermined number.

A rechargeable battery charge controlling device according to the present invention causes a charger to charge a rechargeable battery at constant current and constant voltage based on a target value as a maximum setting value of charging current. The device includes a detection portion, a determination portion, a count portion, and a reduction portion. The detection portion detects the voltage values of the rechargeable battery in a time series. The determination portion determines whether each of the voltage values detected by the detection portion exceeds a predetermined voltage value. The count portion counts the number of the determination times that the determination portion determines that each of the detected voltage values exceeds the predetermined voltage value. The reduction portion reduces the target value if the number counted by the count portion does not exceed a predetermined number.

The rechargeable battery charge controlling device according to the present invention further includes a circuit breaker that cuts off charging current of the rechargeable battery. If the number counted by the count portion exceeds the predetermined number, the circuit breaker cuts off the current.

In the rechargeable battery charge controlling device according to the present invention, the determining portion determines whether the predetermined voltage value is exceeded by (is smaller than) all of the voltage values that are continuously detected by the detection portion for M times (M is an integer not smaller than two). The device further includes an additional determination portion. The additional determination portion that determines whether a second voltage value smaller than the predetermined voltage value is exceeded by all of the voltage values that are continuously detected by the detection portion for M+N times (N is an integer not smaller than one). The second reduction portion reduces the target value if the additional determination portion determines that the second voltage value is exceeded by all of the voltage values that are continuously detected by the detection portion for M+N times.

The rechargeable battery charge controlling device according to the present invention further includes an additional determination portion and a time counting portion. The additional determination portion determines whether the voltage value detected by the detection portion exceeds a second voltage value smaller than the predetermined voltage value. The time counting portion starts counting the time if the additional determination portion determines that the voltage values detected by the detection portion exceeds the second voltage value. The determining portion determines whether the predetermined voltage value is exceeded by the voltage value detected by the detection portion from the count start of the time counting portion starts until a predetermined period of time has elapsed. In addition, the device further includes a second reduction portion that reduces the target value if the determining portion does not determine that the predetermined voltage value is exceeded by the voltage value detected by the detection portion from the count start of the time counting portion starts until a predetermined period of time has elapsed.

In the rechargeable battery charge controlling device according to the present invention, the second reduction portion reduces the target value at a predetermined reduction rate.

The rechargeable battery charge controlling device according to the present invention further includes an additional detection portion and an averaging portion. The additional detection portion detects the charging current values of the rechargeable battery in a time series. The averaging portion obtains the average of the charging current values detected by the detecting portion. The second reduction portion obtains the target value by reducing the value obtained by the averaging portion.

A battery pack according to the present invention includes the aforementioned rechargeable battery charge controlling device, and one or more of rechargeable batteries to be charged by a charger at a current value as target value that is provided from the charge controlling device.

In the battery pack according to the present invention, the plurality of rechargeable batteries are connected in serial or in parallel to each other. The detection portion provides the highest voltage value among detected voltage values of the rechargeable batteries as the detected voltage value.

In the battery pack according to the present invention, the rechargeable batteries are lithium-ion rechargeable batteries.

According to the present invention, if the predetermined number is greater than the number of determination times that the predetermined voltage value is exceeded by the voltage value of the rechargeable battery detected in a time series, the target value of charging current is reduced to a current value smaller than an originally-specified target current value (hereinafter, referred to as a setting current value).

Accordingly, if the restriction number is not exceeded by the number of events that, in the case where the setting current value is too high, the battery voltage value exceeds the protection voltage, the target value of the charger is set smaller than the setting current value to reduce charging current from the charger whereby prevent that the battery voltage exceeds the protection voltage.

According to the present invention, if the predetermined number is exceeded by the number of event that the predetermined voltage value is exceeded by each of the battery voltage values of the rechargeable battery that are detected in a time series, charging current of the rechargeable battery is cut off.

Accordingly, if the rechargeable battery may be overcharged, or if the rechargeable battery is in abnormal condition, the charging operation is forcedly stopped to prevent accidents such as excess heat generation and breakage.

According to the present invention, all of the voltage values of the rechargeable battery that are detected continuously for M times (or continuously for M+N times) in a time series exceed the predetermined voltage value (or exceed the second voltage value smaller than the predetermined voltage value), the target value is reduced.

Accordingly, if all of the detected voltage values continuously exceeds a voltage value that is specified as the upper limit in the normal charging operation (hereinafter, referred to as a setting voltage value), the target value of the charger is reduced to reduce charging current from the charger whereby reducing the battery voltage to a voltage lower than the setting voltage value. Accordingly, irrespective of whether the target value before reduction is the setting current value or a current value reduced from the setting current value, every when the battery voltage exceeds the setting voltage value, the charging operation is continued at a reduced target value so that the actual capacity of the rechargeable battery can be gradually increased.

In addition, in the case where N is set at a suitable large number in accordance with the increase rate of the battery voltage in the beginning of charging operation, before the second voltage value is exceeded by all of the battery voltage values that are continuously detected for M+N times, it will be determined that the predetermined voltage value is exceeded by all of the voltage values of the rechargeable battery that are detected continuously for M times. Accordingly, it is possible to reliably detect that the battery voltage will exceed the protection voltage. Therefore, it is possible to immediately reduce an excess setting current value to a smaller current value.

According to the present invention, when the detected voltage value of the rechargeable battery exceeds the second voltage value smaller than the predetermined voltage value, the target value is differently reduced depending on the case where the detected voltage values of the rechargeable battery exceed the predetermined voltage value or the case where the detected voltage values of the rechargeable battery do not exceed the predetermined voltage value until a predetermined period of time has elapsed after the detected voltage value of the rechargeable battery exceeds the second voltage value.

Accordingly, if the detected battery voltage values do not exceed the protection voltage but exceed the setting voltage value, the target value of the charger is reduced to reduce charging current from the charger whereby reducing the battery voltage to a voltage lower than the setting voltage value. Accordingly, irrespective of whether the target value before reduction is the setting current value or a current value reduced from the setting current value, every when the battery voltage exceeds the setting voltage value, the charging operation is continued at a reduced target value so that the actual capacity of the rechargeable battery can be gradually increased.

In addition, if the detected battery voltage exceeds the protection voltage, it is possible to immediately reduce an excess setting current value to a smaller current value.

According to the present invention, every when the detected battery voltage exceeds the setting voltage value, the target value is reduced at the predetermined reduction rate so that charging current is exponentially reduced whereby keeping the charging operation.

Accordingly, the actual capacity of the rechargeable battery is increased to a maximized value that can be given by the lower limit of the charging current.

According to the present invention, charging current values are detected in a time series that actually flow through the rechargeable battery. The detected values are averaged. The average of the detected values is specified as target value.

Accordingly, if the detected battery voltage exceeds the setting voltage value, the target value is not reduced but a new target value is obtained by reducing the average of the detected charging current values of detected in a time series. Accordingly, a next target value of charging current can be specified in consideration of the level of charging current that actually flows through the rechargeable battery.

According to the present invention, one or more rechargeable batteries is charged at the current value as target value that is provided from the aforementioned rechargeable battery charge controlling device to the charger.

According to this construction, a battery pack can be provided with a rechargeable battery charge controlling device that can reduce charging current from the charger whereby keeping charging the battery pack if the restriction number is not exceeded by the number of events that the battery voltage value exceeds the protection voltage.

According to the present invention, in the case of a plurality of rechargeable batteries, the batteries are connected in series or in parallel to each other. In this case, the highest voltage value among detected voltage values of the rechargeable batteries is defined as the detected voltage value.

Accordingly, in the case where a plurality of rechargeable batteries are connected to each other in series, the target value of the charging current is reduced with reference to a rechargeable battery with the highest battery voltage. Therefore, even if the battery voltages of the serially-connected rechargeable batteries are unbalanced, it is possible to properly reduce the target value of the charger neither too much nor too little.

According to the present invention, the rechargeable batteries are lithium-ion rechargeable batteries. Since the rechargeable battery charge controlling device controls charging operation suitable for lithium ion batteries, it is possible to maximize the characteristics of the rechargeable batteries.

According to the present invention, if the predetermined number is greater than the number of determination times that the predetermined voltage value is exceeded by the battery voltage value, the target value of charging current is reduced to a current value smaller than an originally-specified target current value.

Accordingly, if the restriction number is not exceeded by the number of events that, in the case where the setting current value is too high, the battery voltage value exceeds the protection voltage, the target value of the charger is set smaller than the setting current value to reduce charging current from the charger whereby preventing that the battery voltage exceeds the protection voltage.

Therefore, it is possible to provide a rechargeable battery charging method and a rechargeable battery charge controlling device that can keep charging a rechargeable battery even if the battery voltage of the rechargeable battery exceeds a protection voltage when the rechargeable battery is charged at a relatively large amount of charging current in the beginning of charging operation, and a battery pack to be charged by this charging method. In addition, even if charging current beyond the target value is supplied by a charger in abnormal conditions, it is possible to prevent that battery voltage exceeds the protection voltage.

The above and further objects of the present invention as well as the features thereof will become more apparent from the following detailed description to be made in conjunction with the accompanying drawings.

BRIEF DESCRIPTION OF THE DRAWINGS

FIG. 2 is a table illustratively showing the list of initial values of target values of charging current depending on voltage ranges of battery block, and temperature ranges of battery;

DETAILED DESCRIPTION OF THE INVENTION

The following description will describe embodiments according to the present invention with reference to the drawings. It should be appreciated, however, that the embodiments described below are illustrations of a battery pack to give a concrete form to technical ideas of the invention, and a rechargeable battery charging method, a rechargeable battery charge controlling device and a battery pack of the invention are not specifically limited to the method and battery described below. Furthermore, it should be appreciated that the members shown in claims attached hereto are not specifically limited to members in the embodiments.

First Embodiment

Figure 1:
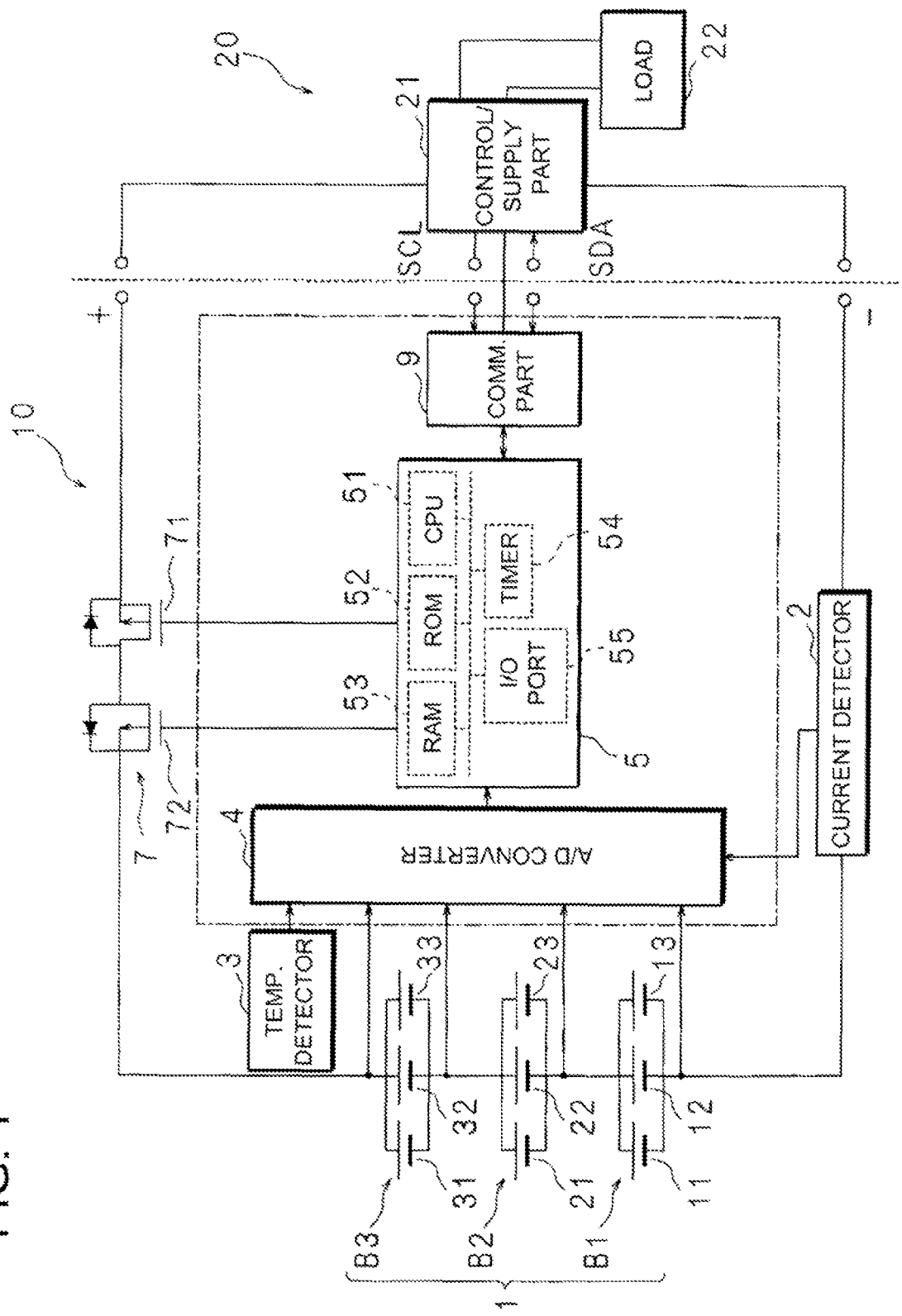
FIG. 1 is a block diagram showing the exemplary construction of a battery pack according to a first embodiment of the present invention.

FIG. 1 is a block diagram showing the exemplary construction of a battery pack according to a first embodiment of the present invention. The battery pack includes a battery pack 10. The battery pack 10 is detachably attached to a load device 20 such as personal computer (PC) and personal digital assistant. The battery pack 10 includes a battery 1. The battery 1 includes battery blocks B1, B2 and B3 that are serially connected to each other in this order. Each of the battery blocks B1, B2 and B3 includes three battery cells of lithium-ion rechargeable batteries 11, 12 and 13, 21, 22 and 23, or 31, 32 and 33 that are connected to each other in parallel to each other. The positive terminal of the battery block B3 and the negative terminal of the battery block 61 serve as the positive terminal and the negative terminal of the battery 1, respectively.

The voltages of the battery block 61, B2 and 83 independently are provided to an analog input terminal of an A/D conversion portion 4, and are converted into digital voltage values. The converted voltage values are is provided from a digital output terminal of the ND conversion portion 4 to a control portion 5 composed of a microcomputer. In addition, the analog input terminal of the A/D conversion portion 4 is provided with the output of a temperature detector 3 and the detecting output of a current detector 2. The temperature detector 3 is arranged in proximity to the battery 1, and detects the temperature of the battery 1 by means of a circuit including a thermistor. The current detector 2 is connected to the negative terminal of the battery 1 on the charging/discharging line, and includes a resistor that detects the charging/discharging current of the battery 1. These detection outputs are converted into digital detecting values, and are provided from the digital output terminal of the ND conversion portion 4 to the control portion 5.

A circuit breaker 7 is connected to the positive terminal side of the battery 1 on the charging/discharging line. The circuit breaker 7 is composed of P-channel type MOSFETs 71 and 72 that cut off charging current and discharging current, respectively. The MOSFETs 71 and 72 are serially connected to each other with their drain terminals being directly connected to each other. Diodes are shown between the drain and source terminals of the MOSFETs 71 and 72. The diodes correspond to parasitism diodes (body diodes) of the MOSFETs 71 and 72.

The control portion 5 includes a CPU 51. The CPU 51 is connected via the bus to a ROM 52, a RAM 53, a timer 54, and an I/O port 55. The ROM 52 stores information such as program. The RAM 53 temporarily stores created information. The timer 54 counts the time. The I/O port 55 provides/receives signals to/from portions of the battery pack 10. The I/O port 55 is connected to the digital output terminal of the A/D conversion portion 4, the gate terminals of the MOSFETs 71 and 72, and a communication portion 9. The communication portion 9 communicates with the control/power-supply portion 21 (charger) included in the load device 20. The ROM 52 is a nonvolatile memory composed of an EEPROM (Electrically Erasable Programmable ROM) or a flash memory. The ROM 52 stores, in addition to the program, learning values of battery capacity, the number of charging/discharging operation cycles, the maximum and minimum values of detected temperature, preserved data relating to detected values in abnormal conditions, and various setting data.

The charge controlling device of the battery 1 is constructed of the control portion 5, the current detector 2, the temperature detector 3, the ND conversion portion 4, the circuit breaker 7, and the communication portion 9.

The CPU 51 executes processing including calculation, providing/receiving and the like based on the control program previously stored in the ROM 52. For example, the CPU 51 reads detected voltage and temperature values of the battery blocks B1 to B3 periodically at a constant period (250 ms in this first embodiment). The CPU 51 determines a target value of charging current based on the read voltage and temperature values, and writes the determined target value into a register (not shown) of the communication portion 9 periodically at the constant period.

In the circuit breaker 7, when an ON signal with L (low) level is provided from the I/O port 55 to the gate terminals of the MOSFETs 71 and 72 in normal charging/discharging operation, current can flow between the drain terminal and the source terminal of each of the MOSFETs 71 and 72. In the case where charging current to the battery is cut off, an OFF signal with H (high) level is provided from the I/O port 55 to the gate terminal of the MOSFET 71 so that current cannot flow between the drain terminal and the source terminal of the MOSFET 71. In the case where discharging current from the battery 1 is cut off, an OFF signal with H (high) level is provided from the I/O port 55 to the gate terminal of the MOSFET 72 so that current cannot flow between the drain terminal and the source terminal of the MOSFET 72. In the case where the battery 1 is in a suitably-charged state, both the MOSFETs 71 and 72 of the circuit breaker 7 are in the ON state so that the battery 1 can be charged/discharged.

The load device 20 includes a load 22 connected to the control/power-supply portion 21. The control/power-supply portion 21 is supplied with electric power from the commercial power (not shown) to drives the load 22 and to supply charging current through the charging/discharging line to the battery 1. On the other hand, if electric power from the commercial power stops being supplied, the control/power-supply portion 21 drives the load 22 with discharging current supplied through the charging/discharging line from the battery 1. In the case where the battery 1 to be charged by the control/power-supply portion 21 is a lithium-ion battery, the case where the battery 1 is charged in constant-current and constant-voltage charging operation where the maximum current value and the maximum voltage are restricted to a value in the range of about 0.5 to 1 C and a value in the range of about 4.2 to 4.4 V/cell. When charging current becomes lower than a predetermined value, it is determined that the battery 1 is fully charged.

The control/power-supply portion 21 and the communication portion 9 are specified as master and slave, respectively. Thus, the control/power-supply portion 21 and the communication portion 9 communicate with each other by using SMBus (System Management Bus) method. In this case, the serial clock (SCL) is supplied from the control/power-supply portion 21. Serial data (SDA) are bidirectionally transmitted between the control/power-supply portion 21 and the communication portion 9. In this first embodiment, the control/power-supply portion 21 reads the information in said register of the communication portion 9 by polling the communication portion 9 periodically at period of 2 seconds. In this polling, for example, the control/power-supply portion 21 is provided from the communication portion 9 with the target value of charging current, which is required to be supplied through the charging/discharging line to the battery 1 from the control/power-supply portion 21.

The aforementioned polling period of 2 seconds can be set by the control/power-supply portion 21.

The following description will describe the initial value (that is, the setting current value) of the target value, which corresponds to the maximum setting value of charging current to be provided to the control/power-supply portion 21 before charging operation of the battery 1 starts.

FIG. 2 is a table illustratively showing the list of initial values of target values of charging current depending on voltage ranges of the battery blocks B1 to B3, and temperature ranges of battery 1. The voltage of the battery blocks B1 to 63 are classified into "smaller than A (unit is V (the same goes for others))", "not smaller than A but smaller than B", "not smaller B but smaller than C", and "not smaller C". The temperature of the battery 1 is classified into the "low temperature range", "normal temperature range", and "high temperature range." The initial value of the target value of the charging current is determined based on the combination of the voltage range and the temperature range. The ROM 52 stores values corresponding to the cells in the table of four rows and three columns shown in FIG. 2 as initial values (unit is mA) of the target value of the charging current determined based on the combinations of the voltage ranges and the temperature ranges. Here, "C" indicates the discharging operation hour rate. For example, 0.5 C refers to a current value (mA) that can be supplied for 2 hours by the electric amount corresponding to the capacity (mAh) of each of the battery blocks B1 to B3.

"A", "B", and "C" in the voltage ranges are 4.00, 4.08, and 4.15, respectively. The boundary temperature value between the "low temperature range and the "normal temperature range" in the temperature range is 10° C. The boundary temperature value between the "normal temperature range" and the "high temperature range" is 45° C. However, the "A", "B" and "C", and the boundary temperature values are not limited to these values.

The initial value of the target value of the charging current is adjusted within the range from 0.1 to 0.8 C depending on the range level of the battery blocks B1 to B3, and the range level of the temperature. The reason is to prevent that, when charging current flows into the battery blocks B1 to 63 and causes rise of the voltages of the battery blocks B1 to B3, which is increased by their internal resistances, the voltages of the battery blocks B1 to B3 exceed a setting voltage value that is set as the upper limit in of the charging operation. The initial values of the target value of the charging current in the low temperature range are specified equal to or lower than the initial values of the target value of the charging current in the normal temperature range and the high temperature range. The reason is to set the upper limit value of the charging current lower in particular in the low temperature range.

In the determination of an initial value of the target value of the charging current be provided to the control/power-supply portion 21 based on the table shown in FIG. 2, a range is selected corresponding to the maximum value among the voltage values of the battery blocks B1 to B3. The reason is to prevent that, in consideration of case where the voltages of the serially-connected battery blocks B1 to B3 are unbalanced, the voltage of a battery with the highest voltage (hereinafter, referred to as a battery block Bh) among the battery blocks exceeds the setting voltage value. As for the temperature range, a range is selected corresponding to the detected temperature value of the battery 1. A value read from the ROM 52 is an initial value that is thus determined based on the combination of the selected voltage range and the selected temperature range. The read value is written in the register of the communication portion 9 as the initial value of the target value of charging current to be provided to the control/power-supply portion 21.

The initial value of the target value of charging current is written into the register of the communication portion 9 periodically at a constant period (e.g., 250 ms) when charging operation of the battery 1 is not performed. For example, it is detected whether the battery 1 is charged based on the sign of the detected value (positive/negative value) of the current detector 2 from viewpoint of opposite flowing directions of charging current and the discharging current.

The following description will describe a method for controlling the target value of charging current in accordance with the voltage value of the battery block Bh that is detected in charging operation of the battery 1.

Figure 3:
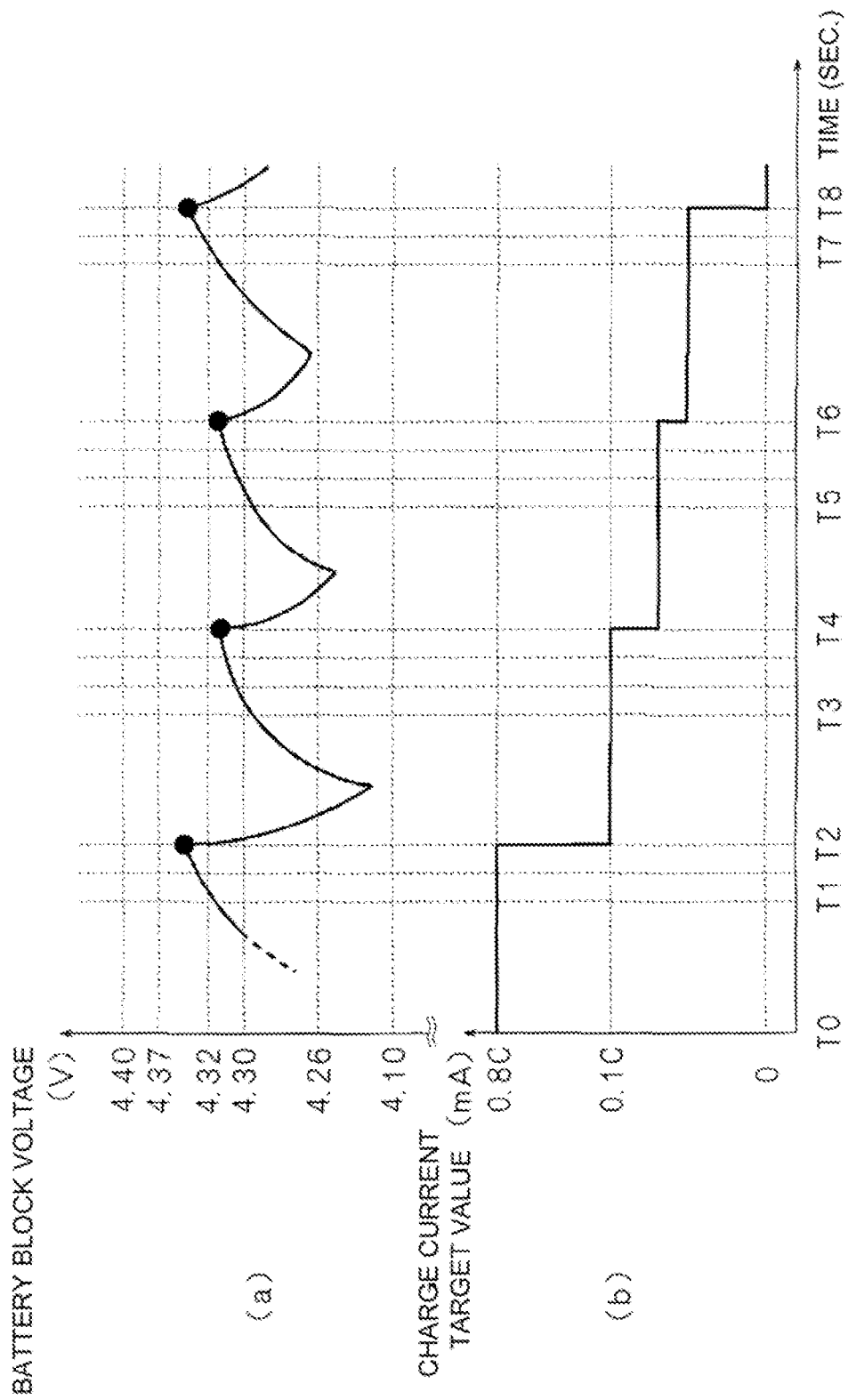
FIG. 3 is a graph schematically showing time variation of the voltage of battery block, and the target value of charging current.

FIG. 3 is a graph schematically showing time variation of the voltage of battery block Bh, and the target value of charging current. FIG. 3($a$) shows the voltage of the battery block Bh. FIG. 3($b$) shows the target value of charging current. In FIG. 3, the horizontal axes indicate time (second). The vertical axis of FIG. 3($a$) indicates the voltage (V) of the battery block Bh. The vertical axis of FIG. 3($b$) indicates the target value (mA) of charging current. In FIG. 3($a$), 4.37 V is the charging voltage (maximum value), while 4.32 V is the protection voltage, which is a limit imposed on the voltage of the battery block Bh. Also, 4.30 V is the setting voltage value that is set as the upper limit in charging operation. The voltage of the battery block Bh is read periodically at a period of 250 ms.

The following description will describe the case where discharging operation of the battery 1 is switched to charging operation at time T0 in FIG. 3. For example, in the case where the control/power-supply portion 21 drives the load 22 with discharging current supplied through the charging/discharging line from the battery 1, if electric power starts being supplied from the commercial power, the control/power-supply portion 21 starts supplying charging current through the charging/discharging line to the battery 1 so that discharging operation of the battery 1 is switched to charging operation. At this time, the target value of charging current is set at an initial value of the target value. Accordingly, the target value of the charging current at time T0 is a value that is determined based on the voltage of the battery block Bh and the temperature of the battery 1 at time T0.

In the case where the battery 1 is discharged before time T0, the voltage of the battery block Bh is reduced by a voltage corresponding to voltage drop produced by the internal resistance of the battery blocks B1 to 83. For example, in the case where the voltage of the battery block Bh before time T0 is reduced to lower than 4.00 V, and the temperature of the battery 1 is not lower than 10° C., even if the battery 1 is in the state where the target value of charging current ought to be determined based on the table shown in FIG. 2 as 0.5 or 0.1 C, the target value of charging current is determined as 0.8 C. In this case, when the charging operation actually starts from time T0 with the target value of charging current being set to 0.8 C, since the battery 1 is supplied with charging current higher than the originally-intended current, the voltage of the battery block Bh may exceed the protection voltage.

For example, in the case where it is detected that the voltage of the battery block Bh exceeds the protection voltage at time T2 in FIG. 3, the target value of charging current is reduced to 0.1 C in this first embodiment. Accordingly, even in the case where the charging operation is continued, the voltage of the battery block Bh can be prevented from exceeding the protection voltage.

It is noted that the reduction value of target value of charging current is not limited to 0.1 C. For example, the reduction value of target value of charging current can be obtained by multiplying the initial value of target value of charging current by a certain value.

After that, in the case where the charging operation is continued with the target value of charging current being reduced to 0.1 C, if it is detected that the voltage values of the battery block Bh exceed the setting voltage value (4.30 V) at time T4 and T6, the charging operation is continued with the target value of the charging current being further reduced for increasing the actual capacity of the battery 1. The target values of charging current to be reduced at time T4 and T6 are calculated by multiplying by 0.9 the average of charging current values during the period from T2 to T4, and the period from T4 to T6, respectively. The reason to calculate a new target value based on the average value is to reduce the target value of charging current in consideration of the amount of the charging current that is actually supplied to the battery 1.

It is noted that the value by which the average of the charging current values is multiplied is not limited to 0.9, but can be other value not higher than 1, or can be obtained a value calculated based on a certain formula.

After that, in the case where the charging operation is continued with the target value of charging current being reduced to a value from 0.1 C, if it is detected that the voltage value of the battery block Bh exceeds the setting voltage value (4.32 V) again at time T8, the OFF signal is provided to the gate of the MOSFET 71 to cut off the charging current in protection processing of the battery 1 in the battery pack 10. It is noted that the protection processing is not limited to interruption of charging current by the circuit breaker 7, but can be conducted by other means that reduce charging current substantially to zero.

A method is now described that reads the voltage value of the battery block Bh for determination.

In this embodiment 1, when it is detected continuously for two times at time T2 that the protection voltage is exceeded by the voltage value of the battery block Bh that is read periodically at a period of 250 ms until time T2 in FIG. 3(*a*), it is determined that the voltage of the battery block Bh exceeds the protection voltage (4.32 V). Also, when it is detected continuously for three times at time T4 that the setting voltage (4.30 V) is exceeded by the voltage value of the battery block Bh that is read periodically at a period of 250 ms until time T4 in FIG. 3(*a*), it is determined that the voltage of the battery block Bh exceeds the setting voltage (4.30 V). The reason to set the number of determination operations (two times) for determining that the voltage value continuously exceeds the protection voltage at a number smaller the number of determination operations (three times) for determining that the voltage value continuously exceeds the setting voltage value is to prevent determination that said voltage value exceeds the setting voltage prior to the determination that said voltage value exceeds the protection voltage even if the voltage of the battery block Bh sharply rises so that said voltage exceeds the protection voltage. Contrary to this, it is preferable that combination of the aforementioned determination values be previously suitably specified so that it can be determined that the voltage of the battery block Bh exceeds the protection voltage before it is determined that the voltage of the battery block Bh exceeds the setting voltage.

In FIG. 3, dashed vertical time lines indicate some continuous timings where the voltage values of the battery block Bh are read. The time interval between time T1 and time T2, and the time interval between time between time T7 and time T8 are 500 ms (250 ms×2). The time interval between time T3 and time T4, and the time interval between time T5 and time T6 are 750 ms (250 ms×3). Specifically, although it is detected that the read voltage value does not exceed the protection voltage at time T1 (or T7), it is detected that the read voltage values exceed the protection voltage continuously for two times until time T2 (or T8). As a result, it is detected that the voltage of the battery block Bh exceeds the protection voltage at time T2 (or T8). Similarly, although it is detected that the read voltage value does not exceed the setting voltage at time T3 (or T5), it is detected that the read voltage values exceed the setting voltage continuously for three times until time T4 (or T6). As a result, it is detected that the voltage of the battery block Bh exceeds the setting voltage at time T4 (or T6).

Figure 4:
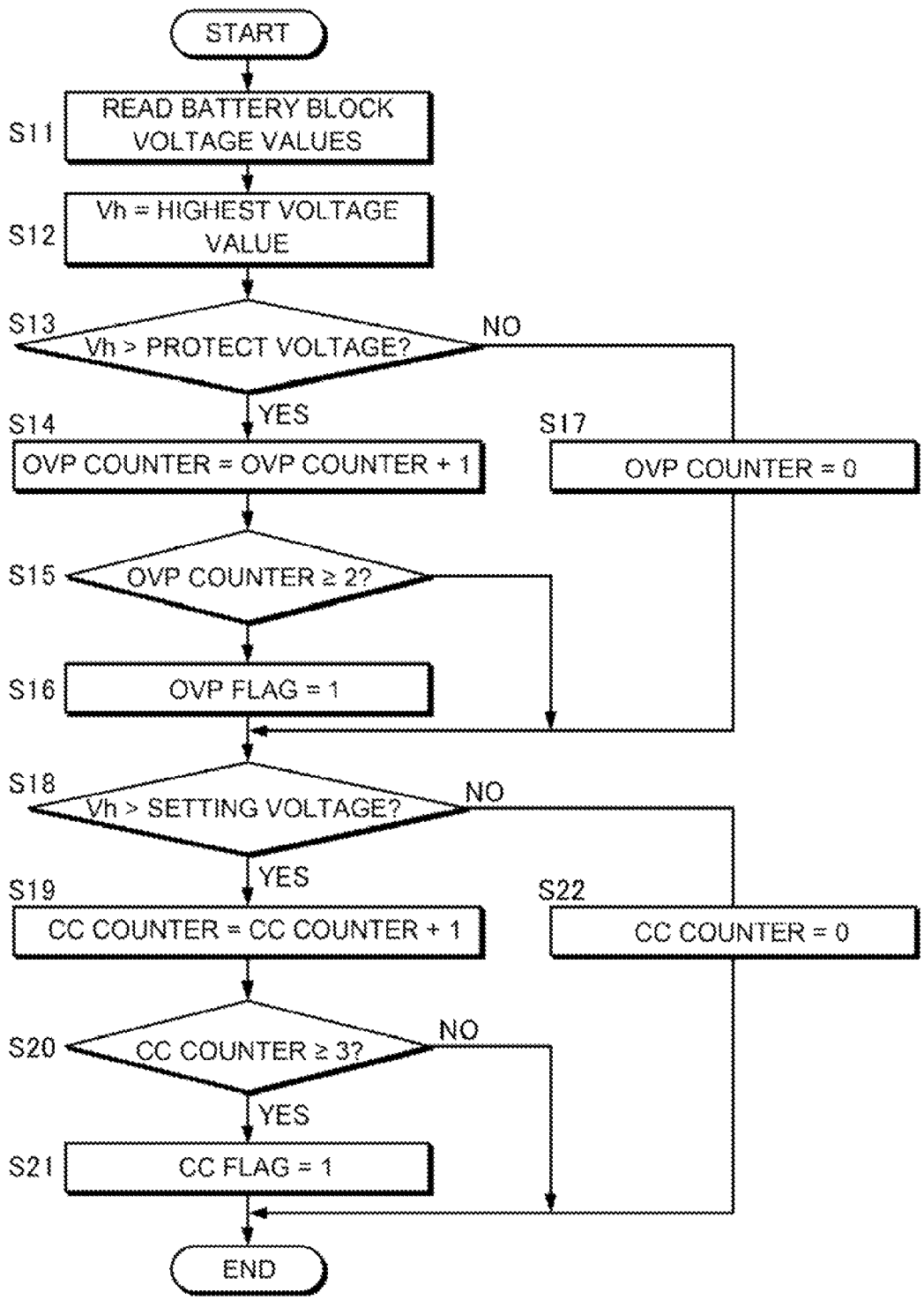
FIG. 4 is a flowchart showing the procedure of a CPU that sets a predetermined flag depending on the voltage of battery block.

FIG. 4 is a flowchart showing the procedure of the CPU 51 that sets a predetermined flag depending on the voltage of battery block Bh. The following procedure is performed periodically at a period of 250 ms in charging operation of the battery 1 by the CPU 51 based on the control program that is previously stored in the ROM 52. The period is not limited to 250 ms. An OVP counter, an OVP flag, a CC counter and a CC flag used in the following procedure are stored in the RAM 53, and are cleared back to zero at initialization of the program.

When the procedure shown in FIG. 4 starts, the CPU 51 reads the voltage values of the battery blocks B1 to B3, which are converted by the ND conversion portion 4, from the I/O port 55 (S11). The voltage value of the battery block Bh with the highest voltage value is stored as Vh (S12). It is noted that, although the voltage value of each of the battery blocks B1 to B3 is read one time in Step S11, the voltage values of each of the battery blocks B1 to B3 can be read for a plurality of times periodically at a short period (e.g., 10 ms) so that at least any one of the maximum value, the minimum value, the average, and a median of voltage values read in the battery blocks B1 to B3 is obtained, and is stored as Vh. Subsequently, the CPU 51 detects whether Vh exceeds the protection voltage (4.32 V) (S13). If Vh exceeds the protection voltage (S13: YES), the OVP counter is incremented by one (S14). Subsequently, the CPU 51 detects whether the OVP counter is higher than one (S15). If the OVP counter is two or more (S15: YES), the OVP flag is set to 1 (S16). Thus, it is determined that the voltage of the battery block Bh exceeds the protection voltage, and the determination is stored. If Vh does not exceed the protection voltage in Step S13 (S13: NO), the CPU 51 clears the OVP counter back to zero (S17).

When the processing of Step S16 is completed, when the OVP counter is smaller than two in Step S15 (S15: NO), or when the processing of Step S17 is completed, the CPU 51 detects whether the setting voltage value (4.30V) is exceeded by Vh (S18). If Vh exceeds the setting voltage value (S18: YES), the CC counter is incremented by one (S19). Subsequently, the CPU 51 detects whether the CC counter is higher than two (S20). If the CC counter is three or more (S20: YES), the OVP flag is set to 1 (S21). Thus, it is determined that the voltage of the battery block Bh exceeds the setting voltage, and the determination is stored. If Vh does not exceed the setting voltage in Step S18 (S18: NO), the CPU 51 clears the CC counter back to zero (S22).

When the aforementioned processing of the step S21 is completed, when the CC counter is smaller than three in Step S20 (S20: NO), or when the processing of Step S22 is completed, the CPU 51 ends the procedure shown in FIG. 4.

It is noted that although the procedure goes to Step S18 when Vh exceeds the protection voltage (Step S13: YES), when the later processing of Step S16 is completed, or when the OVP counter is smaller than two in Step S15 (S15: NO), the procedure of FIG. 4 may end without going to Step S18. In other words, only when Vh does not exceed the protection voltage (Step S13: NO), the procedure may go from Step S17 to Step S18 where it is detected whether Vh exceeds the setting voltage value. According to this procedure, it is possible to prevent determination that the voltage of the battery block Bh exceeds the setting voltage prior to the determination that the voltage of the battery block Bh exceeds the protection voltage even if the voltage of the battery block Bh exceeds the protection voltage.

The method is now described that calculates the average of charging current.

In this first embodiment, the detecting value of the charging current is read and stored periodically at a period of 250 ms. The arithmetical mean is calculated stored as lavg at every detection operation. Calculation of the average is not limited to the arithmetical mean. The average can be obtained as geometric mean, weighted average, or the like.

Figure 5:
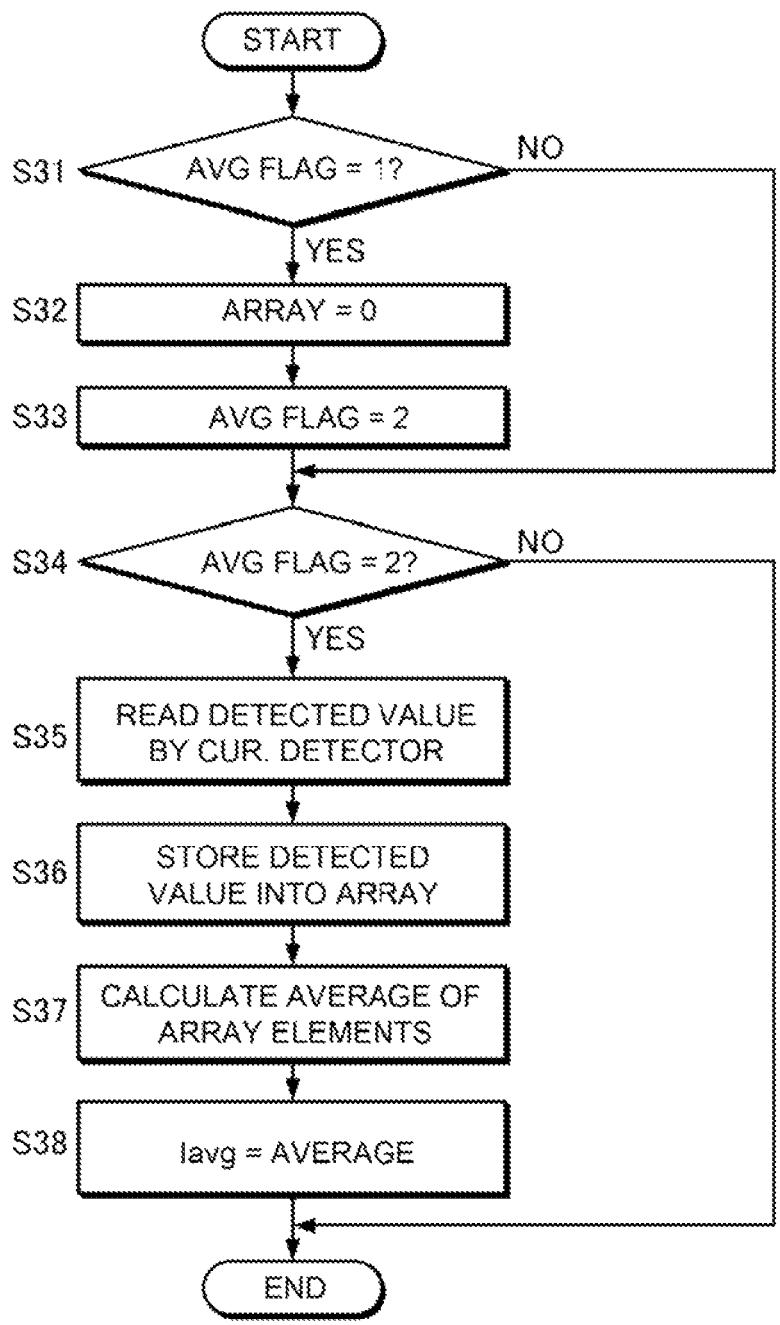
FIG. 5 is a flowchart showing the procedure of the CPU that obtains the average of detected values of charging current.

FIG. 5 is a flowchart showing the procedure of the CPU 51 that obtains the average of detected values of charging current. The following procedure is performed periodically at a period of 250 ms in charging operation of the battery 1 by the CPU 51 based on the control program that is previously stored in the ROM 52. The period is not limited to 250 ms. An AVG flag used in the following procedure are stored in the RAM 53, and are cleared back to zero at initialization of the program. The AVG flag can take a number in the range from 0 to 2. The AVG flag is set to 1 in the later-discussed processing so that the procedure of FIG. 5 is informed of average calculation start.

When processing of FIG. 5 starts, the CPU 51 determines whether the AVG flag is 1 (S31). If the AVG flag is 1 (S31: YES), a work array is cleared back to zero (S32), and the AVG flag is updated to 2 (S33). Thus, the state under average calculation is stored. When the procedure of Step S33 is completed, or when the AVG flag is not 1 in Step S31 (S31: NO), the CPU 51 determines whether the AVG flag is 2 (S34). If the AVG flag is not 2, in other words, if the state is not under averaging calculation (S34: NO), the procedure ends.

If the AVG flag is 2 in Step S34 (S34: YES), the CPU 51 reads the detected value of the current detector 2 from the I/O port 55 (S35). The read detected value is stored in the array (S36). Subsequently, the CPU 51 calculates the average of elements in the array (S37), the calculated average is stored as lavg, which is the average of charging current (S38). After that, the procedure of FIG. 5 ends.

The procedure is now described that reads the OVP flag and the CC flag set in the procedure of FIG. 4, and lavg stored in the procedure of FIG. 5, and write a target value of charging current into the register of the communication portion 9.

Figure 6:
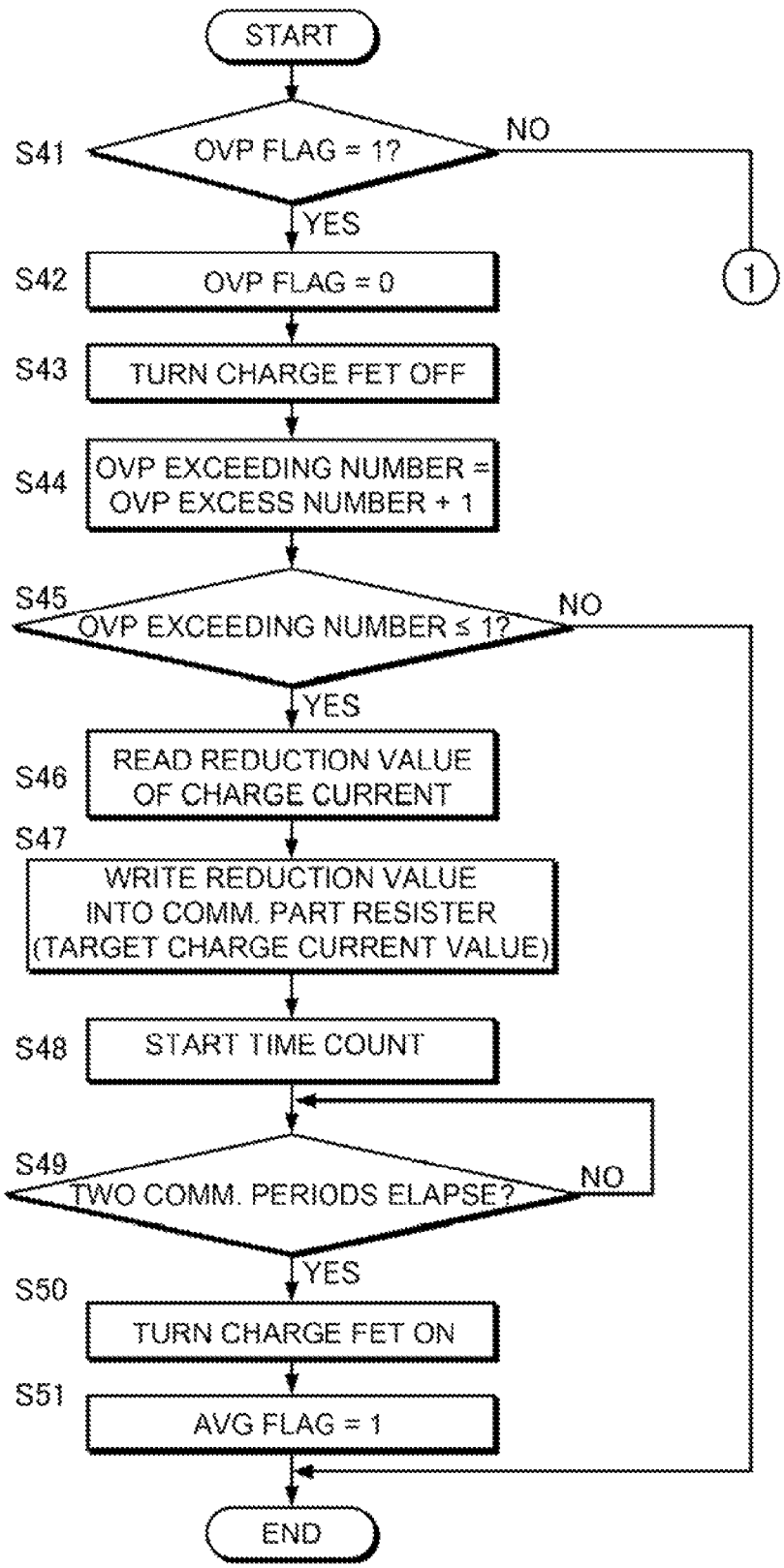
FIG. 6 is a flowchart showing the procedure of the CPU that reduces the target value of charging current.
Figure 7:
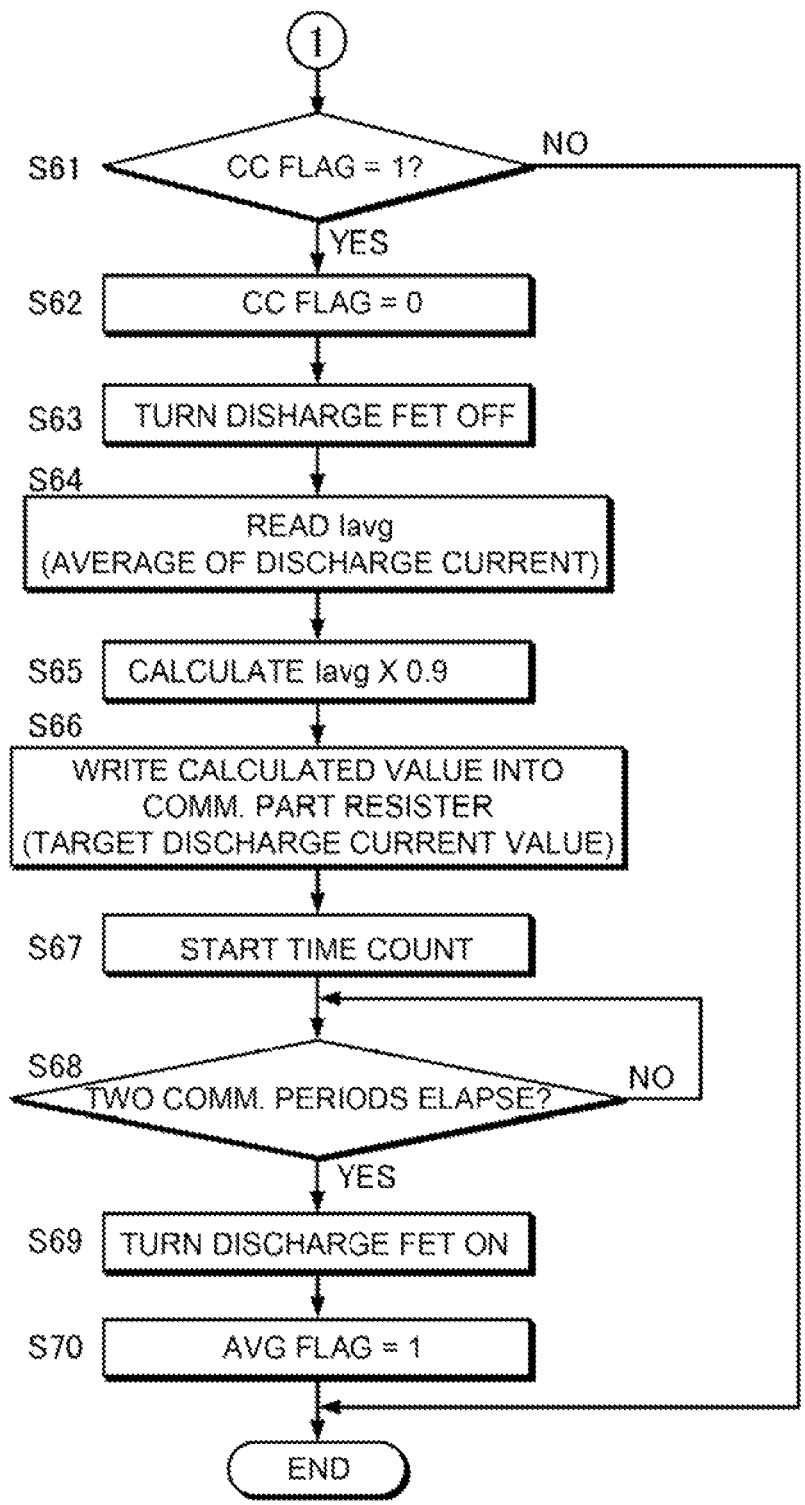
FIG. 7 is a flowchart showing the procedure of the CPU that reduces the target value of charging current.

FIGS. 6 and 7 are flowcharts showing the procedure of the CPU 51 that reduces the target value of charging current. The following procedure has lower execution priority than the procedure of FIGS. 4 and 5, and is performed periodically at a period of 250 ms in charging operation of the battery 1 by the CPU 51 based on the control program that is previously stored in the ROM 52. The period is not limited to 250 ms. An OVP exceeding number used in the following procedure are stored in the RAM 53, and are cleared back to zero at initialization of the program.

When the processing of FIG. 6 starts, the CPU 51 determines whether the OVP flag is 1 (S41). If the OVP flag is 1 (S41: YES), in other words, if it is detected that Vh exceeds the protection voltage, the OVP is cleared back to zero (S42), and the MOSFET (charging FET) 71 for cutting off charging current is turned OFF (S43). Specifically, the OFF signal of H level is provided to the gate terminal of MOSFET 71 from the I/O port 55. Then, the CPU 51 increments the OVP exceeding number (S44) by 1, and detects whether the OVP exceeding number is smaller 1 (S45). If the OVP exceeding number is not smaller than 1 (S45: NO), the CPU 51 keeps the state that is brought in Step S43 where the MOSFET 71 is turned OFF for protection processing. After that, the procedure of FIG. 6 ends. In order to surely execute this protection processing, the CC flag may be cleared back to zero before the procedure of FIG. 6 ends.

If the OVP exceeding number is not lower than 1 (S45: YES), the CPU 51 reads, from the ROM 52, the reduction value to which the target value of charging current is reduced (S46). The reduction value is a value to which the target value of charging current is reduced at time T2, T4, or T6 in FIG. 3. The reduction value at time T2 is 0.1 C as discussed above in this first embodiment. The reduction value is previously stored together with values shown in the table of FIG. 2 in the ROM 52.

Subsequently, the CPU 51 writes, into the register of the communication portion 9, the read reduction value as target value of charging current to be read by the control/power-supply portion 21 (S47).

Subsequently, the CPU 51 causes the timer 54 to start counting the time (S48). After that, the CPU 51 detects whether two periods of polling communication by the control/power-supply portion 21 has elapsed (S49). Thus, the CPU 51 waits for two periods to have elapsed (S49: NO). The polling period is previously stored in the ROM 52, and is set at 2 seconds in this embodiment. The reason to waits for two communication periods to have elapsed is to ensure that the control/power-supply portion 21 receives the reduced target value of charging current.

If the two communication periods has elapsed (S49: YES), the CPU 51 turns the MOSFET 71 for cutting off charging current ON again (S50). Subsequently, the AVG flag is set to 1 so that the procedure of FIG. 5 is informed of start of average calculation of charging current (S51). After that, the procedure of FIG. 6 ends.

The procedure of FIG. 7 following the procedure of FIG. 6 is now described.

If the OVP flag is not 1 in Step S41 of FIG. 6 (S41: NO), the procedure goes to Step S61 of FIG. 7 where the CPU 51 determines whether the CC flag is 1 (S61). When the CC flag is not 1 (S61: NO), the CPU 51 ends the procedure of FIG. 7. When the CC flag is 1 (S61: YES), in other words, when it is detected that Vh exceeds the setting voltage value, the CPU 51 clears the CC flag back to zero (S62) and turns the MOSFET 71 for cutting off charging current OFF (S63). Subsequently, the CPU 51 reads lavg (the average of charging current) calculated in the procedure of FIG. 5 (S64), and obtains a value by multiplying the read value by 0.9 (S65). Then, the calculated value is written as reduced target value of charging current into the register of the communication portion 9 (S66).

Subsequently, the CPU 51 causes the timer 54 to start counting the time (S67). After that, the CPU 51 detects whether two periods of polling communication by the control/power-supply portion 21 elapses (S68). Thus, the CPU 51 waits for two periods to have elapsed (S68: NO). If the two communication periods has elapsed (S68: YES), the CPU 70 turns the MOSFET 71 for cutting off charging current ON again (S69). Subsequently, the AVG flag is set to 1 so that the procedure of FIG. 5 starts average calculation of charging current (S70). After that, the procedure of FIG. 7 ends.

According to this first embodiment, as discussed above, if the number of times is not more than 1 where the voltage value of the battery block detected in a time series in the charging operation is larger than the protection voltage, the target value of charging current is reduced to a current value smaller than the initial value (to 0.1 C). Accordingly, if the initial value of target value of charging current is too high so that a restriction number is smaller than the number of times where the voltage of the battery block exceeds the protection voltage, the target value of charging current is set a value smaller than the initial value so that the charging current from the control/power-supply portion is reduced whereby preventing that the voltage of the battery block exceeds the protection voltage.

Therefore, it is possible to provide a rechargeable battery charging method and a rechargeable battery charge controlling device that can keep charging a rechargeable battery even if the battery voltage of the rechargeable battery exceeds a protection voltage when the rechargeable battery is charged at a relatively large amount of charging current in the beginning of charging operation, and a battery pack to be charged by this charging method.

In addition, in order to shorten the charging operation time, in the case where the protection voltage or a voltage value larger than the setting voltage value is set as the maximum charging voltage value, it is possible to shorten the charging operation time with preventing that the battery is over charged.

In addition, in the case where the number of times exceeds 1 where it is detected that the voltage of the battery block detected in a time series exceeds the protection voltage, the circuit breaker cut off charging current.

Accordingly, if the rechargeable battery may be overcharged, or if the rechargeable battery is in abnormal condition, it is possible to forcedly stop the charging operation whereby preventing accidents such as excess heat generation and breakage.

In addition, if the protection voltage (or setting voltage value) is continuously exceeded for two times (three times) by all of the voltage values of the battery block read in a time series, it is determined that the voltage of the battery block exceeds the protection voltage value (or setting voltage value) so that the target value of charging current is reduced to 0.1 C (or reduced to a value that is further reduced from the currently-set target value). Thus, it can be determined that the voltage of the battery block exceeds the protection voltage before it is determined that the voltage of the battery block exceeds the setting voltage.

Accordingly, it can be reliably detected that the battery voltage of the rechargeable battery exceeds the protection voltage. As a result, it is possible to reduce an initial value of the target value, which is an excessive target value of charging current, to a smaller current value soon. In addition, in the case where the battery voltage of the rechargeable battery exceeds the setting voltage value but does not exceed the protection voltage, the charging operation ca be continued with the target value of charging current being reduced. As a result, it is possible to gradually increase the actual capacity of the rechargeable battery.

In addition, since every when it is detected that the voltage value of the battery block exceeds the setting voltage value, the target value is reduced at the predetermined reduction rate. As a result, supplied charging current is exponentially reduced whereby keeping the charging operation.

Accordingly, it is possible to increase the actual capacity of the rechargeable battery to a maximized value that can be given by the lower limit of the charging current.

In addition, the average of charging current is treated as the target value of the charging current before reduction. In other words, in this case, the average of charging current is the average of values of charging current that actually flows into the battery block in the period during which the target value of charging current is the same value, and are detected in a time series.

Accordingly, a next target value of charging current can be specified in consideration of the level of charging current that actually flows through the rechargeable battery.

In addition, the control/power-supply portion starts charging a plurality of battery blocks with the current value provided from the charge controlling device of the battery being set as the target value of charging current.

Therefore, it is possible to apply, to a battery pack, the rechargeable battery charge controlling device that can keep charging the rechargeable battery even if a restriction number is smaller than the number of times where the battery voltage of the rechargeable battery exceeds the protection voltage when the rechargeable battery is charged at a relatively large amount of charging current in the beginning of charging operation.

In addition, the battery blocks each of which includes the battery cells connected to each other in parallel is serially connected to each other. The highest voltage among the read voltage values of the battery blocks is specified as the voltage value of battery blocks.

Accordingly, even if the battery voltages of the serially-connected rechargeable batteries are unbalanced, it is possible to prevent that the rechargeable batteries are overcharged. Therefore, it is possible to properly control charging operation of the rechargeable batteries, and to properly reduce the target value of the charger neither too much nor too little.

In addition, the rechargeable batteries are lithium-ion rechargeable batteries. Since the rechargeable battery charge controlling device controls charging operation suitable for lithium ion batteries, it is possible to maximize the characteristics of the rechargeable batteries.

It is noted that, although the average of the charging current is calculated in the period during which the target value of charging current is the same value in this first embodiment, the average value of the charging current is not limited to this. The average of the charging current can be obtained by applying a method of moving averages to charging current values in a certain period of time (e.g., one minute). Alternatively, the average of the charging current can be obtained by other averaging methods.

Also, although the target value of charging current is reduced to the value of 0.1 C, which is read from the ROM 52, if the OVP exceeding number is not smaller than 1, that is, if the OVP exceeding number is 1 in the procedure of FIG. 6, in this first embodiment, the reduction of the target value is not limited to this. For example, if the OVP exceeding number is 2, the target value of charging current is reduced to a value smaller than 0.1 from the presently-set target value.

Second Embodiment

In the first embodiment, a parallel detection manner has been described where it is detected that the voltage of the battery block Bh exceeds the protection voltage and the setting voltage value. On the other hand, in the second embodiment, it detected that the voltage of the battery block Bh exceeds the protection voltage (or the setting voltage value) if the voltage of the battery block Bh exceeds the protection voltage until a predetermined period of time has elapsed after the voltage of the battery block Bh exceeds the setting voltage value (or, if the voltage of the battery block Bh does not exceeds the protection voltage until a predetermined period of time has elapsed).

Figure 8:
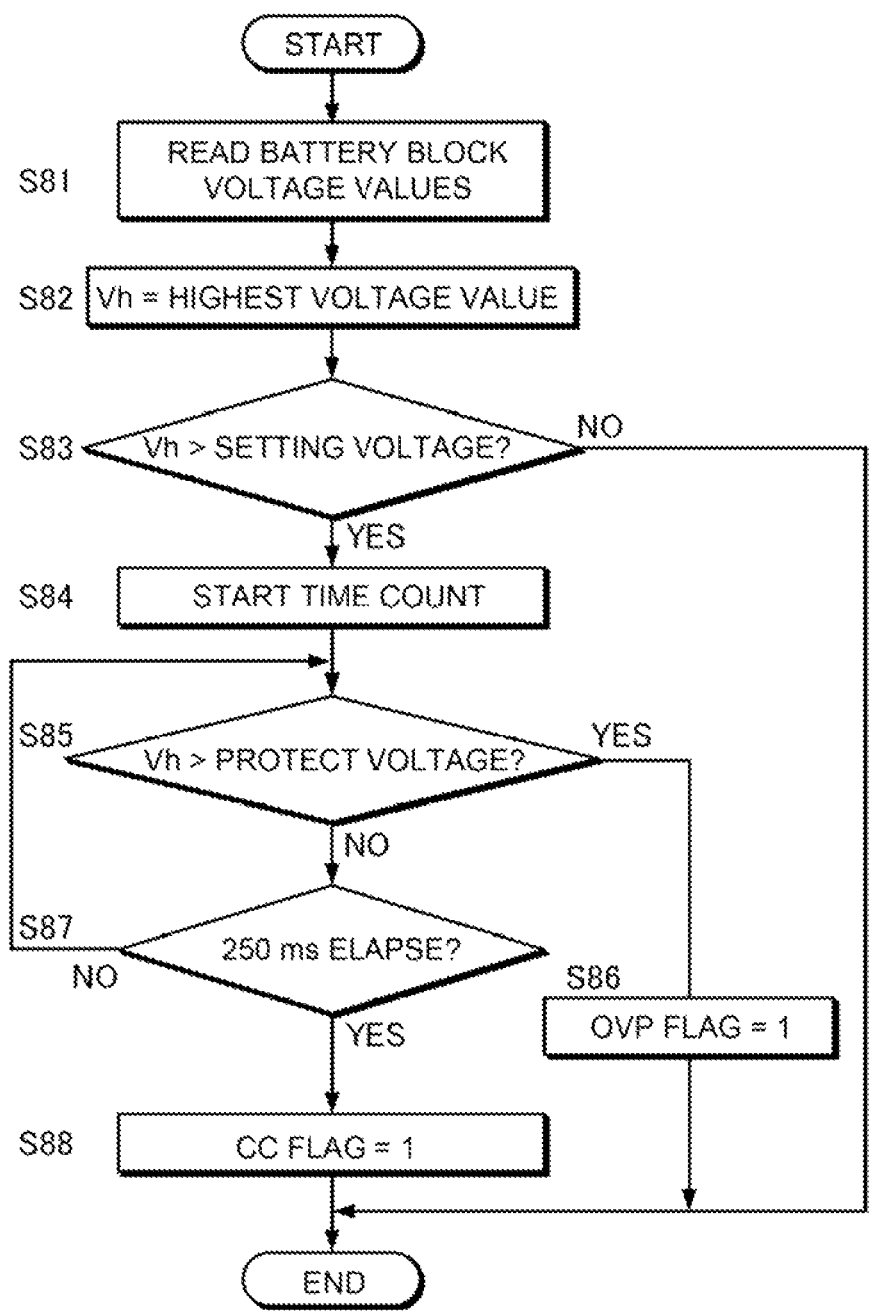
FIG. 8 is a flowchart showing the procedure of the CPU that sets a predetermined flag depending on the voltage of battery block of a battery pack according to a second embodiment of the present invention.

FIG. 8 is a flowchart showing the procedure of the CPU 51 that sets a predetermined flag depending on the voltage of battery block Bh of the battery pack 10 according to the second embodiment of the present invention. The following procedure is performed periodically at a period of 250 ms in charging operation of the battery 1 by the CPU 51 based on the control program that is previously stored in the ROM 52. The period is not limited to 250 ms. The OVP flag and the CC flag used in the following procedure are stored in the RAM 53, and are cleared back to zero at initialization of the program.

When the procedure shown in FIG. 8 starts, the CPU 51 reads the voltage values of the battery blocks B1 to B3, are converted by the ND conversion portion 4, from the I/O port 55 (S81). The voltage value of the battery block Bh with the highest voltage value is stored as Vh (S82). It is noted that, in Step 81, the voltage values of each of the battery blocks B1 to B3 can be read for a plurality of times periodically at a short period (e.g., 10 ms) so that at least any one of the maximum value, the minimum value, the average, and a median of voltage values read in the battery blocks B1 to B3 is obtained, similar to the first embodiment.

Subsequently, the CPU 51 detects whether Vh exceeds the setting voltage (4.30 V) (S83). If Vh does not exceed the setting voltage (S83: NO), the procedure of FIG. 8 ends. That is, any processing is not executed until Vh exceeds the setting voltage value.

If Vh exceeds the setting voltage value (S83: YES), the CPU 51 causes the timer 54 to start counting the time (S84). Subsequently, the CPU 51 detects whether Vh exceeds the protection voltage (S85). If Vh exceeds the protection voltage (S85: YES), the CPU 51 sets the OVP flag to 1 (S86). After that, the procedure of FIG. 8 ends. Thus, it is determined that the voltage of the battery block Bh exceeds the protection voltage, and the determination is stored. If Vh does not exceed the protection voltage in Step S13 (S85: NO), the CPU 51 determines whether a period of 250 ms has elapsed after the timer 54 starts counting the time (S87). When a period of 250 ms has not elapsed (S87: NO), the procedure executed by the CPU 51 returns to Step S85. If a period of 250 ms has elapsed (S87: YES), the CPU 51 sets the CC flag to 1 (S88). After that, the procedure of FIG. 8 ends. Thus, it is determined that the voltage of the battery block Bh exceeds the setting voltage, and the determination is stored.

The reason to wait for Vh to exceed the protection voltage for a period of 250 ms at the maximum is to surely provide enough time for Vh to exceed the protection voltage after Vh exceeds the setting voltage. This period is not limited to 250 ms.

Components according to the second embodiment corresponding to the components the first embodiment are attached with the same reference numerals, and their description is omitted.

As discussed above, in this second embodiment, in the period during of which a period of 250 ms elapses after the read voltage value of the battery block becomes larger than the value of the setting voltage value, if the read voltage value of the battery block becomes larger than the value of protection voltage (or if the read voltage value of the battery block does not become larger than the value of protection voltage), the target value of charging current is reduced to 0.1 C (or the target value of charging current is reduced to a value smaller than the presently-set value).

Accordingly, if it is reliably detected that the battery voltage of the rechargeable battery exceeds the maximum voltage, it is possible to reduce an initial value of the target value, which is an excessive target value of charging current, to a smaller current value soon. In addition, in the case where the battery voltage of the rechargeable battery exceeds the setting voltage value but does not exceed the maximum voltage, the charging operation ca be continued with the target value of charging current being reduced. As a result, it is possible to gradually increase the actual capacity of the rechargeable battery.

It is noted that, in the second embodiment, although in the period during which a period of 250 ms elapses after Vh exceeds the setting voltage value, it is determined whether Vh exceeds the protection voltage, the present invention is not limited to this. For example, when a period of 250 ms has elapsed after Vh exceeds the setting voltage value, it can be determined whether Vh exceeds the protection voltage so that the OVP flag (or the CC flag) is set to 1 if Vh exceeds the protection voltage (or if Vh does not exceed the protection voltage).

In addition, in the first and second embodiments, although the procedure shown in the flowcharts start during the charging operation of the battery 1, since the voltage of the battery block Bh may exceed the setting voltage value only in charging operation, it is not necessary to detect that the battery 1 is charged to start the aforementioned procedure shown in the flowcharts. The aforementioned procedure shown in the flowcharts may periodically start in any operations. However, as discussed above, an initial value of the target value of charging current is written into the communication portion 9 only when charging operation of the battery 1 is not performed.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2010-039016 filed in Japan on Feb. 24, 2010, the content of which is incorporated herein by reference.

What is claimed is:

1. A rechargeable battery charging method that charges a rechargeable battery at constant current and constant voltage based on a target value as a maximum setting value of charging current, the method comprising:
    detecting the voltage values of the rechargeable battery in a time series;
    determining whether each of the detected voltage values exceeds a predetermined voltage value;
    counting a number of the determination times that it is determined that the detected voltage value exceeds the predetermined voltage value; and
    reducing the target value if the counted number of determination times does not exceed a predetermined number,
    wherein the determining step determines whether the predetermined voltage value is exceeded by all of the voltage values that are continuously detected for M times (M is an integer not smaller than two),
    wherein the method further comprises:
    additionally determining whether a second voltage value smaller than the predetermined voltage value is exceeded by all of the voltage values that are continuously detected by the detection portion for M+N times (N is an integer not smaller than one); and
    secondly reducing the target value if the additional determining step determines that the second voltage value is exceeded by all of the voltage values that are continuously detected by the detection portion for M+N times.

2. A rechargeable battery charge controlling device that causes a charger to charge a rechargeable battery at constant current and constant voltage based on a target value as a maximum setting value of charging current, the device comprising:
- a detection portion that detects the voltage values of the rechargeable battery in a time series;
- a determination portion that determines whether each of the voltage values detected by the detection portion exceeds a predetermined voltage value;
- a count portion that counts the number of the determination times that the determination portion determines that each of the detected voltage values exceeds the predetermined voltage value; and
- a reduction portion that reduces the target value if the number counted by the count portion does not exceed a predetermined number,
- wherein the determining portion determines whether the predetermined voltage value is exceeded by all of the voltage values that are continuously detected by the detection portion for M times (M is an integer not smaller than two),
- wherein the device further comprises:
- an additional determination portion for determining whether a second voltage value smaller than the predetermined voltage value is exceeded by all of the voltage values that are continuously detected by the detection portion for M+N times (N is an integer not smaller than one); and
- a second reduction portion that reduces the target value if the additional determination portion determines that the second voltage value is exceeded by all of the voltage values that are continuously detected by the detection portion for M+N times.

3. The rechargeable battery charge controlling device according to claim 2 further comprising a circuit breaker that cuts off charging current of the rechargeable battery, wherein if the number counted by the count portion exceeds the predetermined number, the circuit breaker cuts off the current.

4. The rechargeable battery charge controlling device according to claim 2 further comprising:
- an additional determination portion that determines whether the voltage value detected by the detection portion exceeds a second voltage value smaller than the predetermined voltage value; and
- a time counting portion that starts counting the time if the additional determination portion determines that the voltage value detected by the detection portion exceeds the second voltage value,
- wherein the determining portion determines whether the predetermined voltage value is exceeded by the voltage value detected by the detection portion from the count start of the time counting portion until a predetermined period of time has elapsed, and
- wherein the device further comprises a second reduction portion that reduces the target value if the determining portion does not determine that the predetermined voltage value is exceeded by the voltage value detected by the detection portion from the count start of the time counting portion until a predetermined period of time has elapsed.

5. The rechargeable battery charge controlling device according to claim 2, wherein the second reduction portion reduces the target value at a predetermined reduction rate.

6. The rechargeable battery charge controlling device according to claim 2 further comprising:
- an additional detection portion that detects the charging current values of the rechargeable battery in a time series; and
- an averaging portion that obtains the average of the charging current values detected by the detecting portion,
- wherein the second reduction portion obtains the target value by reducing the value obtained by the averaging portion.

7. A battery pack comprising:
- a rechargeable battery charge controlling device, that causes a charger to charge a rechargeable battery at constant current and constant voltage based on a target value as a maximum setting value of charging current, the device comprising:
- a detection portion that detects the voltage values of the rechargeable battery in a time series;
- a determination portion that determines whether each of the voltage values detected by the detection portion exceeds a predetermined voltage value;
- a count portion that counts a number of the determination times that the determination portion determines that each of the detected voltage values exceeds the predetermined voltage value; and
- a reduction portion that reduces the target value if the number counted by the count portion does not exceed a predetermined number,
- wherein the determining portion determines whether the predetermined voltage value is exceeded by all of the voltage values that are continuously detected by the detection portion for M times (M is an integer not smaller than two),
- wherein the device further comprises:
- an additional determination portion for determining whether a second voltage value smaller than the predetermined voltage value is exceeded by all of the voltage values that are continuously detected by the detection portion for M+N times (N is an integer not smaller than one); and
- a second reduction portion that reduces the target value if the additional determination portion determines that the second voltage value is exceeded by all of the voltage values that are continuously detected by the detection portion for M+N times, and
- one or more of rechargeable batteries to be charged by a charger at a current value as target value that is provided from the charge controlling device.

8. The battery pack according to claim 7, wherein the plurality of rechargeable batteries are connected in serial or in parallel to each other, wherein the detection portion provides the highest voltage value among detected voltage values of the rechargeable batteries as the detected voltage value.

9. The battery pack according to claim 7, wherein the rechargeable batteries are lithium-ion rechargeable batteries.

10. A rechargeable battery charging method that charges a rechargeable battery at constant current and constant voltage based on a target value as a maximum setting value of charging current, the method comprising:
- detecting voltage values of the rechargeable battery at a time interval;
- determining whether each of the detected voltage values exceeds a predetermined voltage value; and
- reducing the target value if the detected voltage values exceed the predetermined voltage value which is a protection voltage for preventing the rechargeable battery from being overcharged for the first time after the charging is started, and
- setting the charging current as zero if the detected voltage values exceed the protection voltage twice.

11. The rechargeable battery charging method according to claim 10, the method further comprising:

counting a number of the determination times that it is determined that the detected voltage value exceeds the predetermined voltage value; and reducing the target value if the counted number of determination times does not exceed a predetermined number.

* * * * *